US008391162B2

(12) United States Patent
Hsu

(10) Patent No.: US 8,391,162 B2
(45) Date of Patent: Mar. 5, 2013

(54) APPARATUS AND METHOD FOR TESTING SMNP CARDS

(75) Inventor: Ming-Yuan Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 226 days.

(21) Appl. No.: 12/975,254

(22) Filed: Dec. 21, 2010

(65) Prior Publication Data

US 2012/0054391 A1 Mar. 1, 2012

(30) Foreign Application Priority Data

Aug. 24, 2010 (TW) .............................. 99128338 A

(51) Int. Cl.
G06F 11/00 (2006.01)
(52) U.S. Cl. ........................................ 370/242; 370/241
(58) Field of Classification Search .................. None
See application file for complete search history.

(56) References Cited

U.S. PATENT DOCUMENTS

| 7,003,563 | B2* | 2/2006 | Leigh et al. | 709/223 |
|---|---|---|---|---|
| 7,010,782 | B2* | 3/2006 | Narayan et al. | 717/124 |
| 2005/0165989 | A1* | 7/2005 | Kim | 710/260 |
| 2005/0256948 | A1* | 11/2005 | Hu | 709/223 |
| 2007/0011282 | A1* | 1/2007 | Alex et al. | 709/220 |
| 2008/0126632 | A1* | 5/2008 | Baier et al. | 710/100 |
| 2009/0077294 | A1* | 3/2009 | Liu | 710/301 |
| 2011/0296071 | A1* | 12/2011 | Hsu | 710/300 |

\* cited by examiner

*Primary Examiner* — Donald Mills
(74) *Attorney, Agent, or Firm* — Altis Law Group, Inc.

(57) ABSTRACT

An apparatus and method tests simple network management protocol (SNMP) cards. Each of the SNMP cards includes an I2C port and a GIPO port. The method predefines an I2C address for each of the slots of a circuit board, sets an interval time for sending communication data by each of the SNMP cards, and determines one of the SNMP cards as a slave device and the other SNMP cards as master devices by detecting an I2C address of each of the GPIO ports. The method controls one of the master devices to send the communication data to the slave device at the interval time, controls the slave device to send a response message to the master device when the communication data is received, and generates information that indicates that an SNMP card corresponding to the master device has malfunctioned when the response message is not received.

13 Claims, 3 Drawing Sheets

| I2C address of a GPIO port | Interval time for each communication | Communication mode |
|---|---|---|
| 0000 | x | Slave device |
| 0001 | 1 | Master device |
| 0010 | 2 | Master device |
| 0011 | 3 | Master device |
| 0100 | 4 | Master device |
| 0101 | 5 | Master device |
| 0110 | 6 | Master device |
| 0111 | 7 | Master device |
| 1000 | 8 | Master device |
| 1001 | 9 | Master device |
| 1010 | 10 | Master device |
| 1011 | 11 | Master device |
| 1100 | 12 | Master device |
| 1101 | 13 | Master device |
| 1110 | 14 | Master device |
| 1111 | 15 | Master device |

FIG. 2

APPARATUS AND METHOD FOR TESTING SMNP CARDS

BACKGROUND

1. Technical Field

Embodiments of the present disclosure relate to methods and systems for testing performance of electronic devices, and particularly to an apparatus and method for synchronously testing a plurality of simple network management protocol (SNMP) cards.

2. Description of Related Art

Network devices, such as servers, routers or gateways, have SNMP cards for connecting communication cables to communicate with network systems. In order to assure the stability and reliability of the SNMP cards, it is necessary to perform a burn-in test before the SNMP cards are installed in the network devices. The burn in test may require use of many communication cables to test the SNMP cards, resulting in more cost, inefficiency, and increasing complexity of the operation. As a result, the above-mentioned problems need to be addressed.

BRIEF DESCRIPTION OF THE DRAWINGS

FIG. 2 shows a schematic diagram illustrating one example of communication modes of the SNMP cards in FIG. 1.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
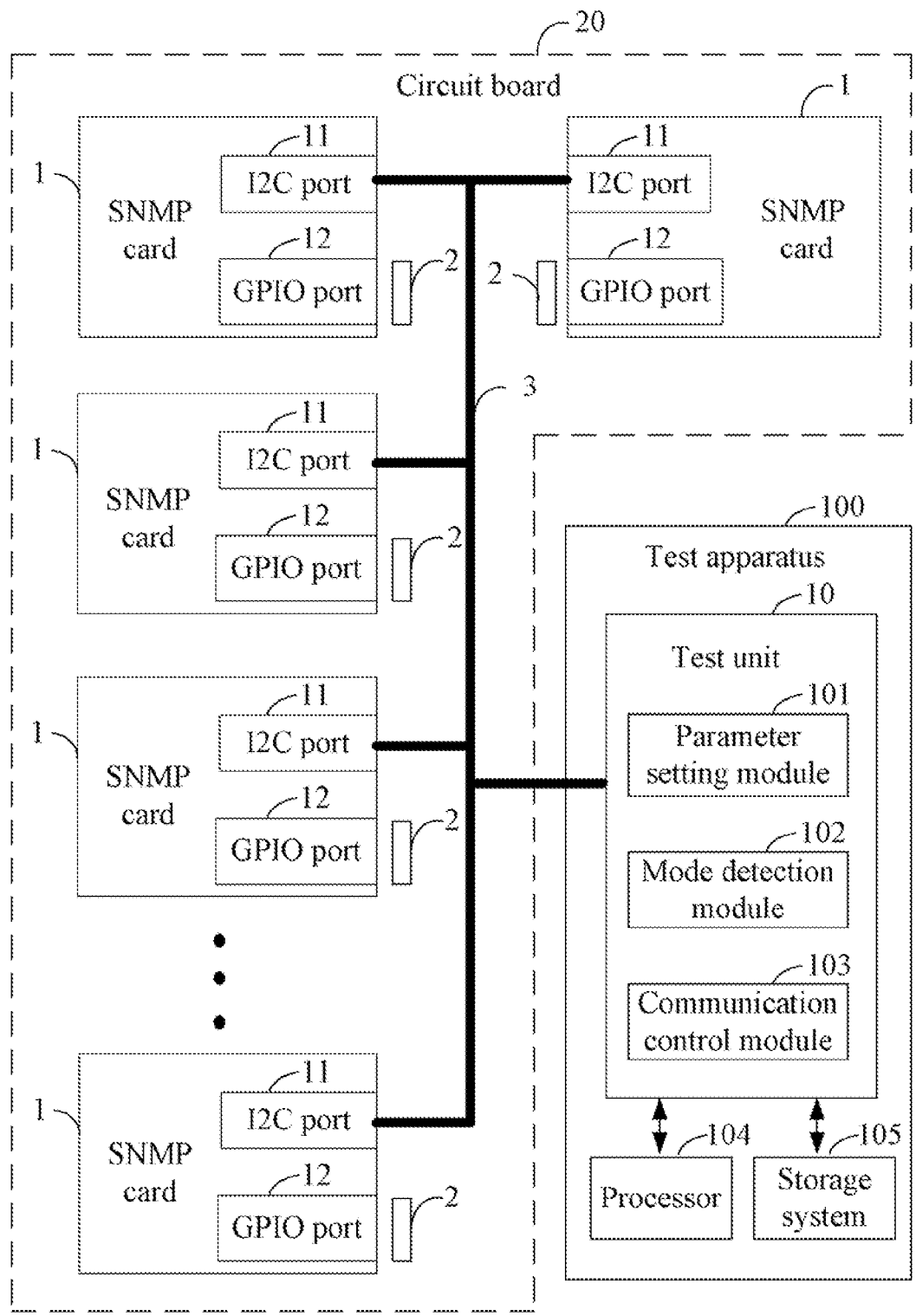
FIG. 1 is a schematic diagram of one embodiment of a test apparatus for testing SNMP cards.

FIG. 1 is a schematic diagram of one embodiment of a test apparatus 100 for testing simple network management protocol (SNMP) cards 1. The test apparatus 100 can synchronously test data communication between each of the SNMP cards 1 to evaluate a reliability of each of the SNMP cards 1. In the embodiment, a number of the SNMP cards 1 may be $2^n$, where n is a natural number, such as 1, 2, 3, 4, for example. In a non-limiting example, the number of SNMP cards 1 used in this disclosure is sixteen. The test apparatus 100 may be a personal computer, a server, or other computing device.

The test apparatus 100 connects to a circuit board 20 by an inter-integrated circuit (I2C) bus 3. The circuit board 20 includes a plurality of slots 2, each of the slots 2 installed with the SNMP card 1. Each of the SNMP cards 1 includes an I2C port 11 and a general purpose input-output (GIPO) port 12. Each of the SNMP cards 1 connects to the I2C bus 3 by the I2C port 11 in a parallel connection, and is plugged into a slot 2 by the GIPO port 12 respectively. Each of the SNMP cards 1 communicates with the test apparatus 100 through the I2C bus 3.

Each of the slots 2 corresponds to an I2C address that is defined as a binary number, such as the binary numbers from "0000" to "11111", where "0" represents a low voltage level, and "1" represents a high voltage level. Each of the GPIO ports 12 corresponds to an I2C address of the corresponding slot 2 when each of the SNMP card 1 is plugged into the corresponding slot 2. Referring to FIG. 2, each of the GPIO ports 12 corresponds to an unique I2C address, such as the binary numbers from "0000" to "11111".

In one embodiment, the test apparatus 100 may include a test unit 10, a least one processor 104, and a storage system 105. The test unit 10 may comprise computerized code in the form of one or more programs that are stored in the storage system 105 and executed by the at least one processor 104. The storage system 105 may be an internal storage device, such as a random access memory (RAM) for temporary storage of information, and/or a read only memory (ROM) for permanent storage of information. In some embodiments, the storage system 105 may also be an external storage device, such as an external hard disk, a storage card, or a data storage medium.

In the embodiment, the test unit 10 may include a parameter setting module 101, a mode detection module 102, and a communication control module 103. The modules 101-103 may comprise computerized code in the form of one or more programs that are stored in the storage system 105. The computerized code includes instructions that are executed by the at least one processor 104 to provide functions for implementing the modules 101-103. In general, the word "module," as used herein, refers to logic embodied in hardware or firmware, or to a collection of software instructions, written in a program language. In one embodiment, the program language may be Java or C. One or more software instructions in the modules may be embedded in firmware, such as an EPROM. The modules described herein may be implemented as either software and/or hardware modules and may be stored in any type of computer-readable medium or other storage device.

The parameter setting module 101 is operable to predefine an I2C address for each of the slots 2, and set an interval time for sending communication data by each of the SNMP cards 1. Referring to FIG. 2, the interval time of the SNMP card 1 corresponding to the I2C address "0000" is set as "x" seconds, which is a waiting time for receiving the communication data from one of the SNMP cards 1. The interval time of the SNMP card 1 corresponding to the I2C address "0001" may be set as 1 second, and the interval time of the SNMP card 1 corresponding to the I2C address "11111" may set as 15 seconds.

The mode detection module 102 is operable to detect an I2C address of each of the GPIO ports 12 when the SNMP cards 1 is plugged into the corresponding slot 2 by the GPIO port 12, and determine whether the I2C address of each of the GPIO ports 12 is equal to a binary number "0000". If the I2C address of the GPIO port 12 is equal to the binary number "0000", the mode detection module 102 determines the SNMP card 1 corresponding to the GPIO port 12 as a slave device. If the I2C address of the GPIO port 12 is not equal to the binary number "0000", the mode detection module 102 determines the SNMP card 1 corresponding to the GPIO port 12 as a master device. Referring to FIG. 2, the SNMP card 1 corresponding to the GPIO port 12 having the binary number "0000" is defined as the slave device, and each of the SNMP cards 1 corresponding to the GPIO port 12 having the binary number from "0001" to "1111" is defined as the master device.

The communication control module 103 is operable to control each of the master devices to send the communication data to the slave device through the I2C bus 3 according to the interval time, and control the slave device to send a response message to each of the master devices when the slave device receives the communication data from each of the master devices. The communication control module 103 is further operable to determine whether each of the master devices receives the response message from the slave device. When a master device does not receive the response message, the communication control module 103 stops testing the master device, and generates information that indicates that the SNMP card 1 corresponding to the master device has malfunctioned.

Figure 3:
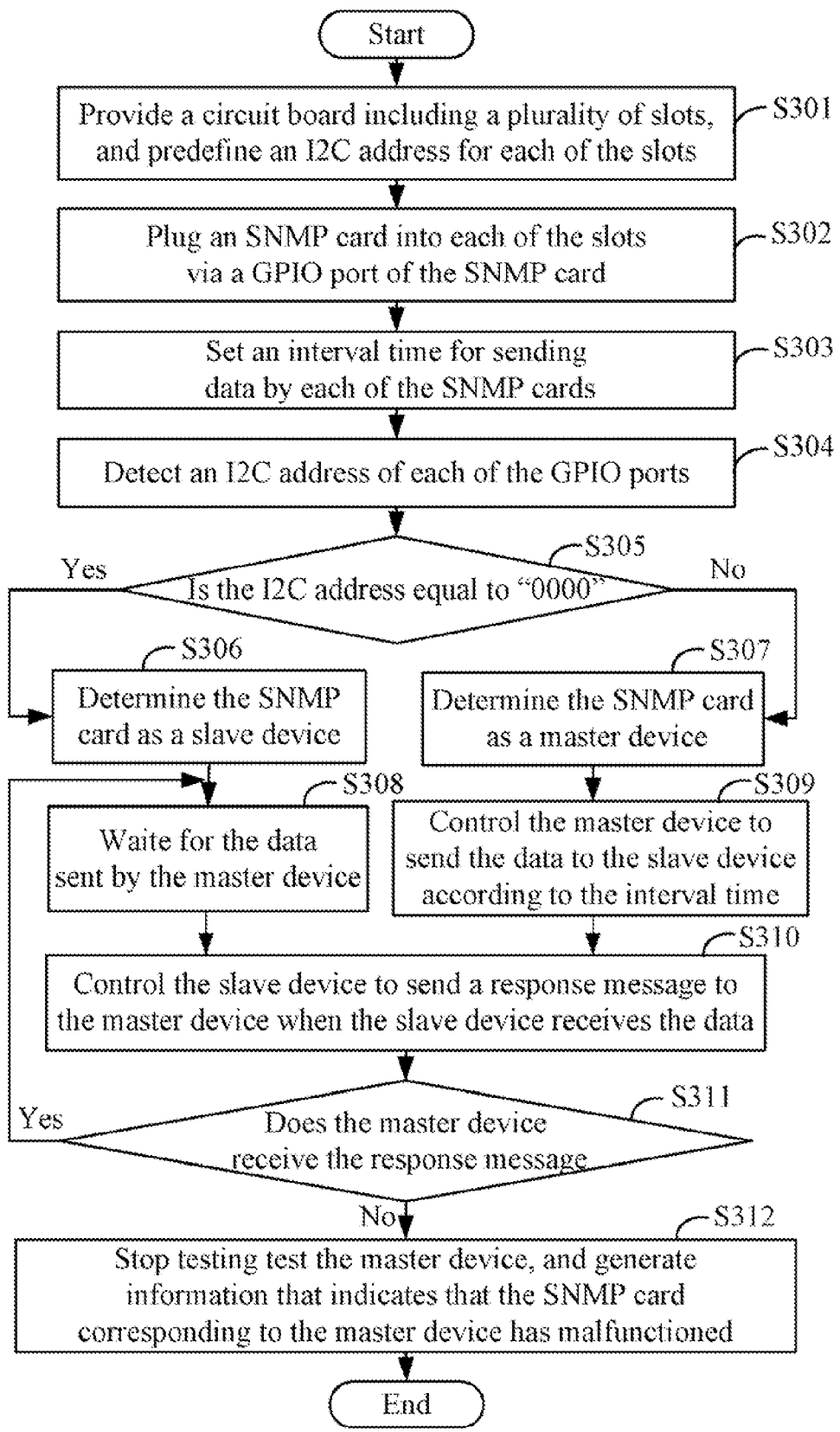
FIG. 3 is a flowchart of one embodiment of a method for testing SNMP cards by using a device, such as the test apparatus of FIG. 1.

FIG. 3 is a flowchart of one embodiment of a method for testing simple network management protocol (SNMP) cards by the test apparatus 100 of FIG. 1. The method can synchronously tests data communication between each of the SNMP cards 1 to evaluate reliability of each of the SNMP cards 1. In the embodiment, the number of the SNMP cards 1 is defined as 16 cards. Depending on the embodiment, additional blocks may be added, others removed, and the ordering of the blocks may be changed.

In block S301, the parameter setting module 101 predefines an I2C address for each of the slots 2 of the circuit board 20. As mentioned above, each of the slots 2 corresponds to the I2C address that is defined as a binary number, such as the binary numbers from "0000" to "11111", where "0" represents a low voltage level, and "1" represents a high voltage level.

In block S302, the parameter setting module 101 builds a parallel connection for each of the SNMP cards 1 when the SNMP card 1 is plugged into a corresponding slot 2 by the GIPO port 12. In one embodiment, each of the GPIO ports 12 corresponds to an I2C address of the corresponding slot 2 when the SNMP card 1 is plugged into the corresponding slot 2. Referring to FIG. 2, each of the GPIO ports 12 corresponds to an unique I2C address, such as the binary numbers from "0000" to "11111".

In block S303, the parameter setting module 101 sets an interval time for sending communication data by each of the SNMP cards 1. Referring to FIG. 2, the interval time of the SNMP card 1 corresponding to the I2C address "0000" is set as "x" seconds. The interval time of the SNMP card 1 corresponding to the I2C address "0001" may be set as 1 second, and the interval time of the SNMP card 1 corresponding to the I2C address "11111" may set as 15 seconds.

In block S304, the mode detection module 102 detects an I2C address of each of the GPIO ports 12 when the SNMP card 1 is plugged into the corresponding slot 2 by the GPIO port 12. In block S305, the mode detection module 102 determines whether the I2C address of each of the GPIO ports 12 is equal to a binary number "0000". If the I2C address of the GPIO port 12 is equal to the binary number "0000", block S306 is implemented. Otherwise, if the I2C address of the GPIO port 12 is not equal to the binary number "0000", block S307 is implemented.

In block S306, the mode detection module 102 determines the SNMP card 1 corresponding to the GPIO port 12 as a slave device. Referring to FIG. 2, the SNMP card 1 corresponding to the GPIO port 12 having the binary number "0000" is defined as the slave device.

In block S307, the mode detection module 102 determines the SNMP card 1 corresponding to the GPIO port 12 as a master device. Referring to FIG. 2, each of the SNMP cards 1 corresponding to the GPIO port 12 having the binary number from "0001" to "1111" is defined as the master device.

In block S308, the communication control module 103 controls the slave device to wait for receiving the communication data sent from one of the master devices before the set waiting time arrives. In block S309, the communication control module 103 controls each of the master devices to send the communication data to the slave device through the I2C bus 3 according to the interval time.

In block S310, the communication control module 103 controls the slave device to send a response message to a master device when the slave device receives the communication data from the master device.

In block S311, the communication control module 103 determines whether the master device receives the response message from the slave device. If the master device receives the response message, block S308 is repeated until all of the master devices have been tested. Otherwise, if the master device does not receive the response message, block S312 is implemented.

In block S312, the communication control module 103 stops testing the master device, and generates information that indicates that the SNMP card 1 corresponding to the master device has malfunctioned.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An apparatus for testing simple network management protocol (SNMP) cards, each of the SNMP cards comprising an inter integrated circuit (I2C) port and a general purpose input-output (GIPO) port, the apparatus being connected to a circuit board comprising a plurality of slots and an I2C bus, the apparatus comprising:
   a storage device;
   at least one processor; and
   a test unit comprising one or more modules that is stored in the storage device and executed by the at least one processor, the one or more modules comprising:
   a parameter setting module that predefines an I2C address for each of the slots, and sets an interval time for sending communication data by each of the SNMP cards;
   a mode detection module that detects an I2C address of each of the GPIO ports when the SNMP card is plugged into a slot via the GPIO port, and determines one of the SNMP cards as a slave device and the other SNMP cards as master devices by checking whether the I2C address of each of the GPIO ports is equal to a predefined binary number; and
   a communication control module that controls each of the master devices to send the communication data to the slave device through the I2C bus according to the interval time, controls the slave device to send a response message to each of the master devices when the slave device receives the communication data from each of the master devices, and generates information that indicates that an SNMP card corresponding to a master device has malfunctioned when the master device does not receive the response message from the slave device.

2. The apparatus according to claim 1, wherein each of the SNMP cards connects to the I2C bus via the I2C port of the SNMP card in a parallel connection.

3. The apparatus according to claim 1, wherein the I2C address is selected from the group consisting of binary numbers "0000" to "11111", where "0" represents a low voltage level and "1" represents a high voltage level.

4. The apparatus according to claim 3, wherein the mode detection module determines the SNMP card as the slave device upon the condition that the I2C address of the GPIO port of the SNMP card is equal to the binary number "0000".

5. The apparatus according to claim 3, wherein the mode detection module determines the SNMP card as the master device upon the condition that the I2C address of the GPIO port of the SNMP card is not equal to the binary number "0000".

6. A method for testing simple network management protocol (SNMP) cards, each of the SNMP cards comprising an inter integrated circuit (I2C) port and a general purpose input-output (GIPO) port, the method comprising:
   providing a circuit board that comprises a plurality of slots and an I2C bus, and predefining an I2C address for each of the slots;
   plugging an SNMP card into each of the slots via the GPIO port of the SNMP card;
   setting an interval time for sending communication data by each of the SNMP cards;
   detecting an I2C address of each of the GPIO ports;
   determining one of the SNMP cards as a slave device and the other SNMP cards as master devices by checking whether the I2C address of each of the GPIO ports is equal to a predefined binary number;
   controlling each of the master devices to send the communication data to the slave device through the I2C bus according to the interval time;
   controlling the slave device to send a response message to each of the master devices when the slave device receives the communication data from each of the master devices; and
   generating information that indicates that an SNMP card corresponding to a master device has malfunctioned when the master device does not receive the response message from the slave device.

7. The method according to claim 6, wherein each of the SNMP cards connects to the I2C bus via the I2C port of the SNMP card in a parallel connection.

8. The method according to claim 6, wherein the I2C address is selected from the group consisting of binary numbers "0000" to "11111", where "0" represents a low voltage level and "1" represents a high voltage level.

9. The method according to claim 8, wherein the determining step comprises:
   checking whether the I2C address of the GPIO port of each of the SNMP cards is equal to a binary number "0000"; and
   determining the SNMP card as the slave device upon the condition that the I2C address of the GPIO port of the SNMP card is equal to the binary number "0000"; or
   determining the SNMP card as the master device upon the condition that the I2C address of the GPIO port of the SNMP card is not equal to the binary number "0000".

10. A non-transitory storage medium having stored thereon instructions that, when executed by at least one processor of a computing device, causes the computing device to perform a method for testing simple network management protocol (SNMP) cards, each of the SNMP cards comprising an inter integrated circuit (I2C) port and a general purpose input-output (GIPO) port, the method comprising:
   providing a circuit board that comprises a plurality of slots and an I2C bus, and predefining an I2C address for each of the slots;
   plugging an SNMP card into each of the slots via the GPIO port of the SNMP card;
   setting an interval time for sending communication data by each of the SNMP cards;
   detecting an I2C address of each of the GPIO ports;
   determining one of the SNMP cards as a slave device and the other SNMP cards as master devices by checking whether the I2C address of each of the GPIO ports is equal to a predefined binary number;
   controlling each of the master devices to send the communication data to the slave device through the I2C bus according to the interval time;
   controlling the slave device to send a response message to each of the master devices when the slave device receives the communication data from each of the master devices; and
   generating information that indicates that an SNMP card corresponding to a master device has malfunctioned when the master device does not receive the response message from the slave device.

11. The non-transitory storage medium according to claim 10, wherein each of the SNMP cards connects to the I2C bus via the I2C port of the SNMP card in a parallel connection.

12. The non-transitory storage medium according to claim 10, wherein the I2C address is selected from the group consisting of binary numbers "0000" to "11111", where "0" represents a low voltage level and "1" represents a high voltage level.

13. The non-transitory storage medium according to claim 12, wherein the determining step comprises:
   checking whether the I2C address of the GPIO port of each of the SNMP cards is equal to a binary number "0000"; and
   determining the SNMP card as the slave device upon the condition that the I2C address of the GPIO port of the SNMP card is equal to the binary number "0000"; or
   determining the SNMP card as the master device upon the condition that the I2C address of the GPIO port of the SNMP card is not equal to the binary number "0000".

* * * * *